United States Patent
Miller et al.

(10) Patent No.: US 10,430,412 B2
(45) Date of Patent: Oct. 1, 2019

(54) RETRIEVAL OF ENTERPRISE CONTENT THAT HAS BEEN PRESENTED

(71) Applicant: Microsoft Technology Licensing, LLC, Redmond, WA (US)

(72) Inventors: Robin Miller, Oslo (NO); Ashok Kuppusamy, Oslo (NO); Thanuja Priyadarshani, Oslo (NO); Stefan Debald, Oslo (NO); Manolis Platakis, Oslo (NO); Sangram Jyoti Bal, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 14/195,389

(22) Filed: Mar. 3, 2014

(65) Prior Publication Data

US 2015/0248459 A1 Sep. 3, 2015

(51) Int. Cl.
*G06F 16/20* (2019.01)
*G06F 16/2455* (2019.01)
*G06F 16/901* (2019.01)
*G06Q 10/10* (2012.01)

(52) U.S. Cl.
CPC ...... *G06F 16/2455* (2019.01); *G06F 16/9024* (2019.01); *G06Q 10/10* (2013.01)

(58) Field of Classification Search
None
See application file for complete search history.

(56) References Cited

U.S. PATENT DOCUMENTS

| | | | |
|---|---|---|---|
| 8,166,061 B2 | 4/2012 | Armstrong et al. | |
| 8,341,528 B2 | 12/2012 | Chaudhary et al. | |
| 9,054,919 B2* | 6/2015 | Kiang | H04L 29/0854 |
| 9,521,172 B1* | 12/2016 | Goenka | H04L 65/403 |
| 2003/0065722 A1* | 4/2003 | Ieperen | G06F 21/31 709/205 |
| 2003/0208534 A1* | 11/2003 | Carmichael | G06Q 10/10 709/203 |
| 2004/0168133 A1 | 8/2004 | Wynn et al. | |
| 2006/0146765 A1* | 7/2006 | Van De Sluis | G06F 3/016 370/338 |
| 2009/0119246 A1* | 5/2009 | Kansal | G06F 17/30038 |
| 2010/0169440 A1 | 7/2010 | O'Sullivan et al. | |
| 2010/0257456 A1 | 10/2010 | Lieb et al. | |
| 2012/0150863 A1 | 6/2012 | Fish et al. | |
| 2012/0278405 A1* | 11/2012 | Costenaro | H04L 67/2857 709/206 |

(Continued)

FOREIGN PATENT DOCUMENTS

| CN | 102902786 A | 1/2013 |
|---|---|---|
| CN | 104067270 A | 9/2014 |

OTHER PUBLICATIONS

"International Search Report and Written Opinion Issued in PCT Patent Application No. PCT/US2015/017879", dated May 29, 2015, 10 Pages.

(Continued)

*Primary Examiner* — Belix M Ortiz Ditren

(57) ABSTRACT

When content is shared, the sharer of the content is identified, as are the audience members. An entry is generated in a data store that identifies the content, the sharer and the audience members. Content retrieval requests can then be processed against the data store to identify and return content.

17 Claims, 15 Drawing Sheets

(56) References Cited

U.S. PATENT DOCUMENTS

| | | |
|---|---|---|
| 2013/0007066 A1 | 1/2013 | Doganata et al. |
| 2013/0191719 A1 | 7/2013 | Underhill et al. |
| 2014/0059010 A1* | 2/2014 | Uchida .................. H04N 7/155 707/661 |
| 2016/0112476 A1* | 4/2016 | Gudipaty ............... G06Q 10/10 715/753 |

OTHER PUBLICATIONS

Doganata, et al., "Visualizing a Meeting as a Graph to Increase the Accessibility of Meeting Artifacts", Retrieved on: Jan. 22, 2014, Available at: http://www.doganata.us/papers/Meeting%20provenance-CHI2010-final.pdf Hester, Matt, "Find it All with SharePoint Enterprise Search", Published on: Jan. 1, 2007, Available at: http://technet.microsoft.com/en-us/magazine/2007.01.search.aspx.

"Second Written Opinion Issued in PCT Application No. PCT/US2015/017879", dated Jan. 13, 2016, 6 Pages.

"International Preliminary Report on Patentability Issued in PCT Application No. PCT/US2015/017879", dated May 10, 2016, 7 Pages.

"Office Action Issued in European Patent Application No. 15710654.3", dated Feb. 19, 2018, 8 Pages.

"Office Action and Search Report Issued in Chinese Patent Application No. 201580012024.1", dated Feb. 19, 2019, 14 Pages.

"Summons to Attend Oral Proceedings Issued in European Patent Application No. 15710654.3", Mailed Date: Jan. 30, 2019, 10 Pages.

* cited by examiner

RETRIEVAL OF ENTERPRISE CONTENT THAT HAS BEEN PRESENTED

BACKGROUND

Computer systems are currently in wide use. Many types of computer systems enable users to generate content that can be shared with other people.

By way of example, information worker applications include such things as word processing applications, presentation applications, and spreadsheet applications. All of these types of applications allow a user to generate content that can be shared with other people. In fact, users that use information worker applications present content and view presented content on a regular basis. The content that is presented is normally in a high quality form because it has often been specifically prepared for presentation to others.

Enterprise computer systems are also currently in wide use. Such systems are deployed at companies or other organizations to assist employees in conducting the business of the organization. Some examples of enterprise systems include enterprise resource planning (ERP) systems, customer relations management (CRM) systems, and line-of-business (LOB) systems. Enterprise computer systems can include web application platforms that can be used with networking functionality, content management and document management and they can also include collaboration systems, social networking systems, extranets, website and enterprise search systems, as well as business intelligence systems.

Users of information worker applications are often employed by enterprise or other organizations, and use enterprise systems as well. Thus, a user of an information worker application may create and present content to other employees. The content may be a document, a slide presentation, a spreadsheet, or a wide variety of other content. It can be stored either locally, with the creator, or on an enterprise database. It can also be stored in a cloud-based system, or in other ways as well.

It is common for viewers of a presentation to want to use the content from one or more presentations that they have previously viewed. However, because the presentation content is often scattered around various enterprise storage locations, it can be difficult for an audience member who has viewed a presentation to locate it. In some cases, an audience member may feel comfortable asking the presenter directly to share a link to the presentation content, but this is not always true.

The discussion above is merely provided for general background information and is not intended to be used as an aid in determining the scope of the claimed subject matter.

SUMMARY

When content is shared, the sharer of the content is identified, as are the audience members. An entry is generated in a data store that identifies the content, the sharer and the audience members. Content retrieval requests can then be processed against the data store to identify and return content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
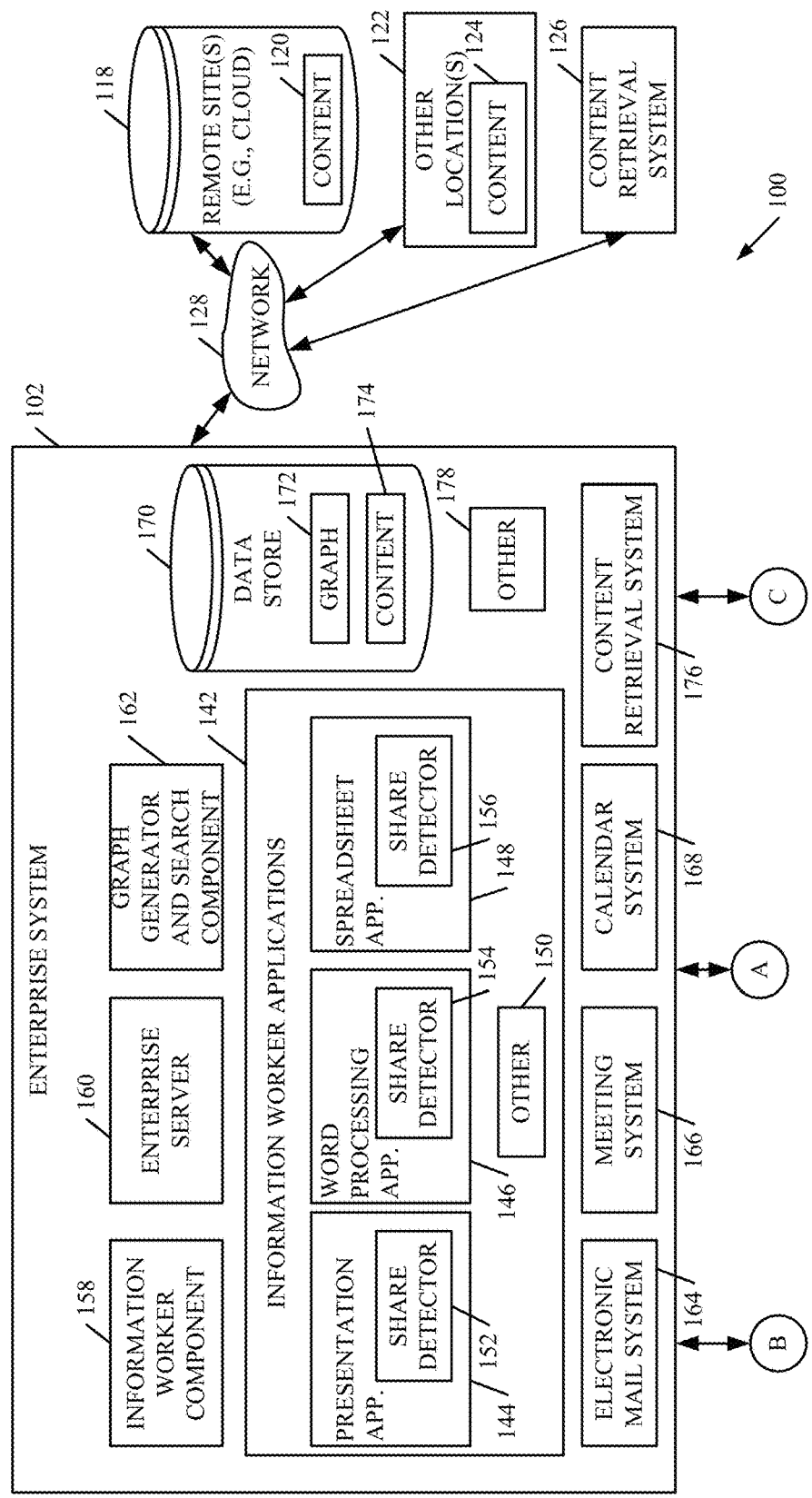
FIGS. 1A and 1B (collectively referred to as FIG. 1) is a block diagram of one illustrative content retrieval architecture.
Figure 1B:
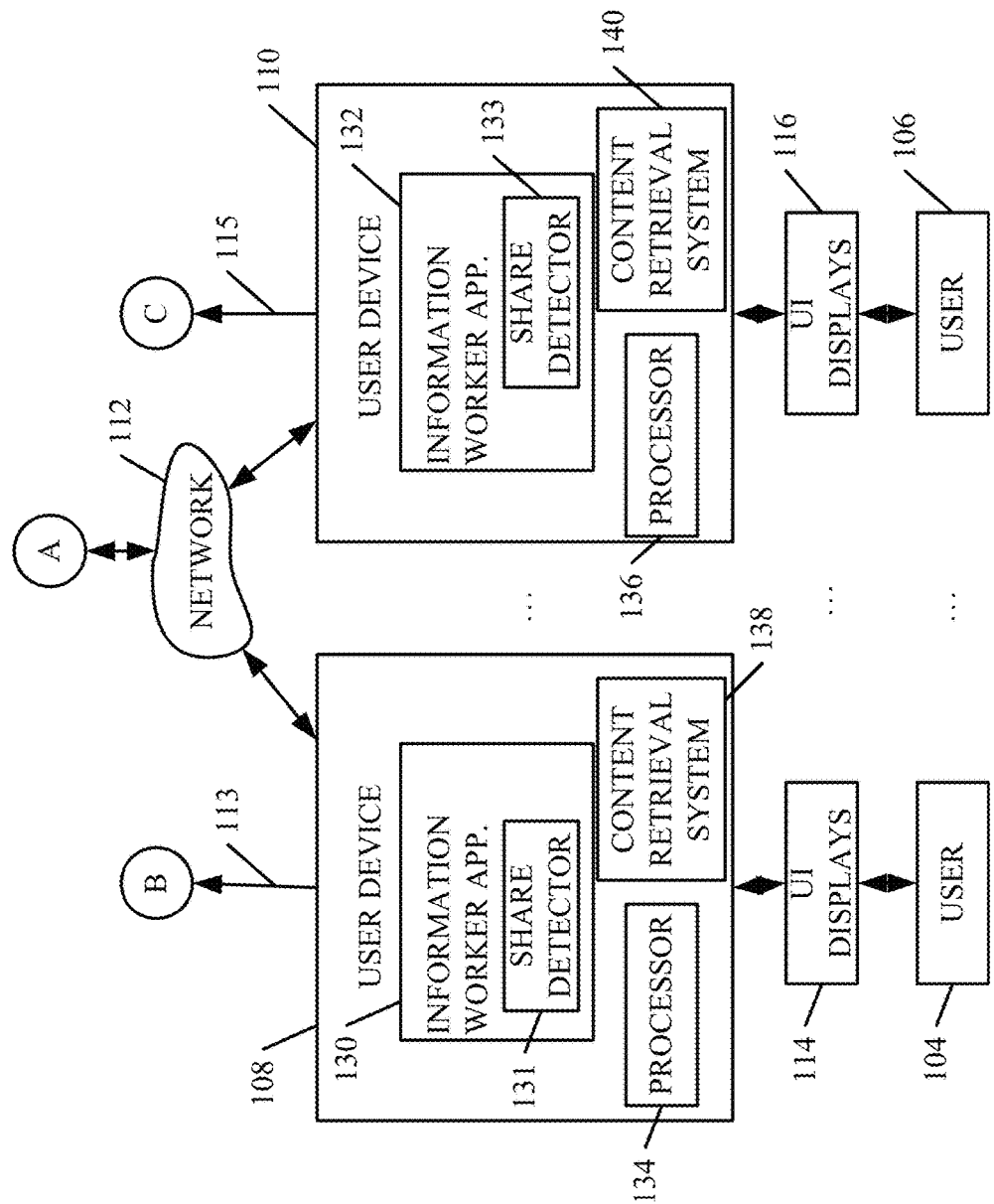

FIGS. 1A and 1B are collectively referred to as FIG. 1. FIG. 1 is a block diagram of one illustrative content retrieval architecture 100. Architecture 100 shows that enterprise system 102 is accessible by a plurality of different users 104-106 through user devices 108-110, that access enterprise system 102 through network 112 or directly (as indicated by arrows 113 and 115). In doing so, user devices 108-110 illustratively generate user interface displays 114-116 that have user input mechanisms that users 104-106 can interact with in order to access and manipulate enterprise system 102.

Architecture 100 also shows that enterprise system 102 illustratively has access (over network 128) to remote sites 118 that can contain content 120. It also has access to other locations 122, that can also contain content 124. In addition, FIG. 1 shows that enterprise system 102 can access a content retrieval system 126 over network 128. In one embodiment, networks 112 and 128 are the same network, although they can be separate networks as well.

FIG. 1 shows that each user device 108-110 can illustratively run information worker applications 130-132 (that each include a share detector 131 and 133), respectively. They can include word processing applications, spreadsheet applications, slide presentation applications, among others. Each user device 108-110 can also include a processor 134-136.

FIG. 1 shows that enterprise system 102 illustratively includes one or more information worker applications 142 which, themselves, can include a presentation application 144, a word processing application 146, a spreadsheet application 148, or other applications 150. Each of the applications 142 illustratively includes a share detector component 152, 154, and 156, respectively. Components 152, 154 and 156 are described below.

FIG. 1 also shows that enterprise system 102 illustratively includes information worker component 158, enterprise server 160, graph generator and search component 162, electronic mail system 164, meeting system 166, calendar system 168, and data store 170 (which itself can include graphs 172 and content 174). It will also be noted that enterprise system 102 can include other components as well, and this is indicated by block 178.

A content retrieval system can be located at one of a plurality of different locations in architecture 100, or it can be located at multiple locations or distributed among multiple locations. FIG. 1 illustrates a variety of different embodiments of this.

For instance, each user device 108-110 can include a content retrieval system 138-140. System 102 can also include a content retrieval system 176. Thus, a content retrieval system can be deployed on user devices 108-110, it can be accessible over a network (such as system 126), or it can be deployed within system 102. All of these embodiments are contemplated herein. In yet another embodiment, content retrieval systems 138 and 140 represent client-side components that operate in conjunction with content retrieval system 126 or 176.

Before describing the content retrieval system and the overall operation of architecture 100 in more detail, a brief description of some of the elements in architecture 100 will first be provided. FIG. 1 shows that, in one embodiment, each of the information worker applications 130, 132, 144, 146 and 148 includes a corresponding share detector 131, 133, 152, 154 and 156. The share detector illustratively detects when a user is sharing content from the corresponding information worker application. For instance, when the information worker application is a presentation application (such as a slide presentation application 144), then the share detector 152 corresponding to the presentation application illustratively detects when the user configures the presentation application to enter presentation mode. This is interpreted as an indication that the user is sharing, or is about to share, content using the presentation application. The share detectors can detect that content is being shared in a variety of other ways as well, and some of these are described in greater detail below.

Information worker component 158 illustratively runs the information worker applications 142. This can be done under the control of enterprise server 160, or otherwise.

Graph generator and search component 162 illustratively generates an enterprise graph for various entities defined in enterprise system 102. By way of example, enterprise system 102 can define entities as individual people, messages, content (such as documents, presentations, spreadsheets, etc.), meetings, teleconferences, customers, vendors, or a wide variety of other things. In one embodiment, graph generator and search component 162 illustratively generates edges (or links) between the various entities. Each edge identifies a relationship between the entities that it connects. For instance, when a given user creates a document, component 162 illustratively generates an edge between the entity that represents the user and the entity that represents the created document. The edge will identify a relationship that indicates that the user created the document. As another example, when a user attends a meeting, then component 162 illustratively generates an edge in the enterprise graph that connects the entity representing the user to the entity representing the meeting. The edge will indicate that the user was an attendee (or a presenter) at the meeting.

Data store 170 illustratively stores content 174 generated using information worker applications 142, as well as the graphs 172 that are generated by component 162. It will be noted, however, that the content created by the information worker applications can be stored in other locations as well. For instance, it can be stored as content 120 in remote (e.g., cloud-based) data store 118. It can be stored as content 124 in other locations 122 as well. It will also be noted that the graph 172 can be stored in remote locations either along with the content or separately from the content.

Electronic mail system 164 illustratively allows the users of enterprise system 102 to send and receive electronic mail messages. It can include a wide variety of other messaging systems as well, and electronic mail is mentioned as only one example.

Meeting system 166 illustratively allows users of enterprise system 102 to schedule meetings to send and receive meeting requests. This can be used in conjunction with calendar system 168 to schedule meetings with individuals and to allocate resources (such as conference rooms, and other resources) among the users of enterprise system 102.

The content retrieval system, no matter where it is located (such as on one of user devices 108 and 110 as content retrieval systems 138 and 140, in system 102 as content retrieval system 176, or remotely as content retrieval system 126) illustratively receives the output from each of the share detectors to determine that content is being shared. The content retrieval system then identifies who is sharing the content and who is in the audience. It then generates an entry in a searchable data store (such as data store 170 or in another data store that it maintains itself) identifying the content, the sharer and the audience (as examples although other searchable parameters can be stored as well). Thus, when a user subsequently wishes to access the content, the searchable data store can be searched by that user.

Figure 2:
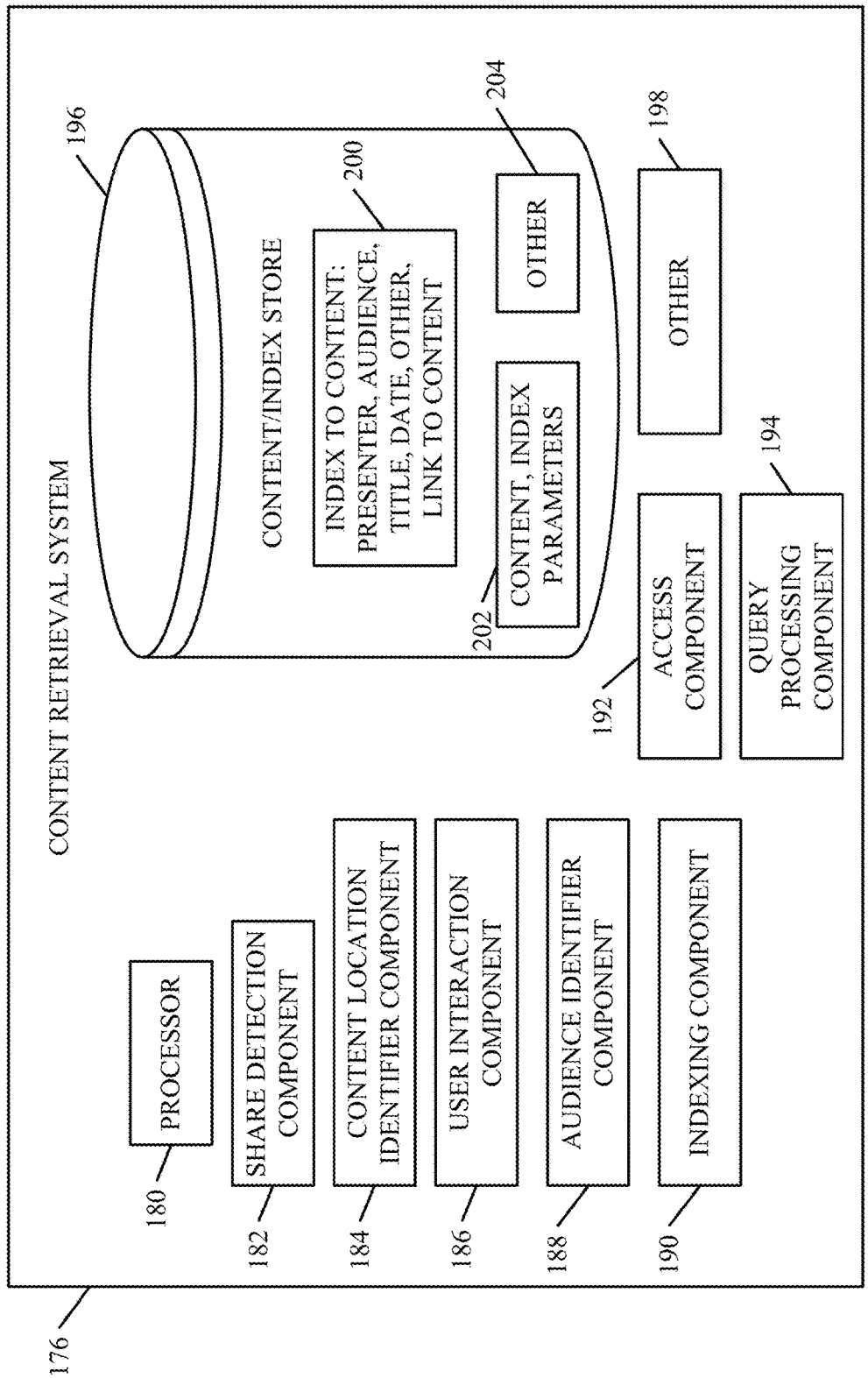
FIG. 2 is a more detailed block diagram of one embodiment of a content retrieval system.

FIG. 2 shows one embodiment of a block diagram of a content retrieval system in more detail. In the embodiment described herein, the content retrieval system shown in FIG. 2 is content retrieval system 176 deployed in enterprise system 102. It will be appreciated, however, that it could also be content retrieval system 138, 140 or 126. Content retrieval system 176 is described by way of example only.

FIG. 2 shows that, in one embodiment, content retrieval system 176 includes processor 180, share detection component 182, content location identifier component 184, user interaction component 186, audience identifier component 188, indexing component 190, access control component 192, query processing component 194, content/index store 196 and it can include other items 198 as well. FIG. 2 also shows that, in one embodiment, content/index store 196 stores an index 200 to the content. The index can include index parameters, such as presenter, audience, title, presentation date, and other parameters, along with a link to the underlying content. Store 196 is also shown storing the content 202, along with the index parameters, so that it can be searched. Store 196 can include other items 204 as well.

Again, FIG. 2 shows only one example in which content retrieval system 176 maintains its own searchable data store 196 of content. It will be noted that the searchable data store can be disposed within data store 170 in enterprise system 102, or it can be stored in other places or in other ways as well, and the embodiment in which it is deployed in content retrieval system 176 is illustrated only as one example.

Figure 3:
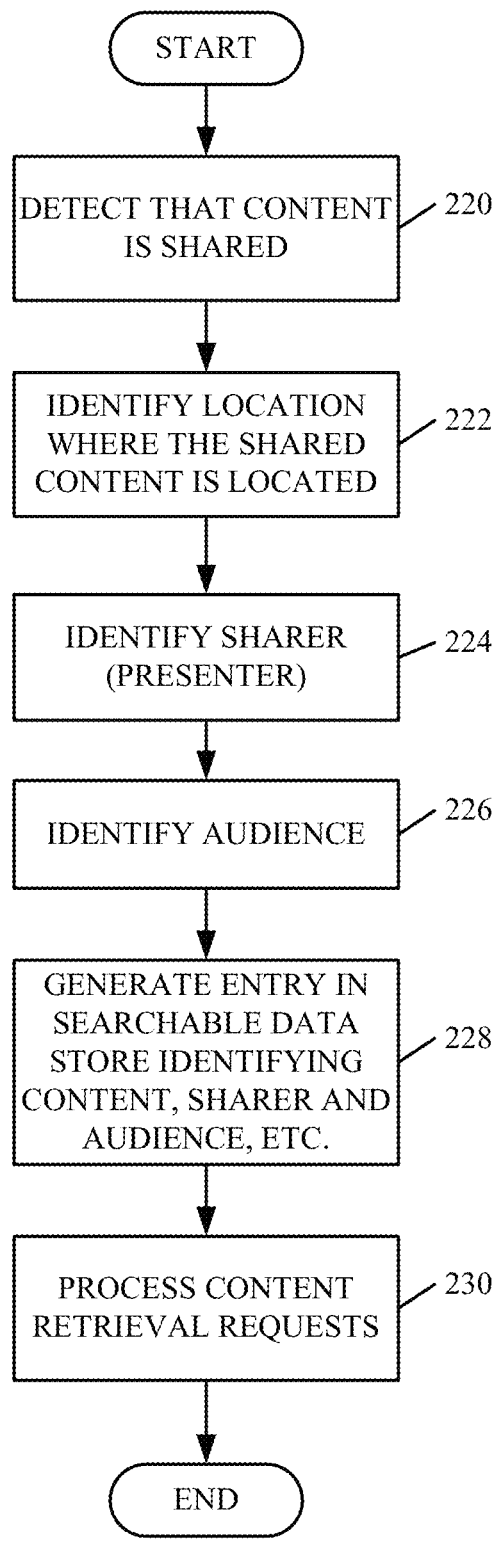
FIG. 3 is a flow diagram illustrating one embodiment of the overall operation of the content retrieval system shown in FIG. 2.

FIG. 3 shows a flow diagram of one embodiment of the overall operation of content retrieval system 176 in identifying content that is shared, and storing it in a data store. FIGS. 1-3 will now be described in conjunction with one another.

Share detection component 182 first detects that content is shared. This is indicated by block 220 in FIG. 3. In one embodiment, share detection component 118 receives an output from one of the share detectors 131, 133, 152, 154 and 156 indicating that a user is sharing content. This can be done in a variety of different ways, some of which are described in greater detail below with respect to FIG. 4.

Content location identifier component 184 identifies the location where the shared content is currently stored. For instance, it can identify that it is stored locally on enterprise system 102, remotely, or at other locations. Identifying the location where the shared content is stored is indicated by block 222 in FIG. 3. User interaction component 186 then identifies the sharer of the content. This is indicated by block 224.

Audience identifier component 188 then identifies the individuals or groups that the shared content is being shared with. For instance, if the user is presenting the content in a presentation, then audience identifier component 188 identifies the audience for the presentation. Identifying the audience can be done in a number of other ways as well, and these are also described below with respect to FIG. 4. Identifying the audience is indicated by block 226 in FIG. 3.

Indexing component 190 then generates an entry in the data store 196. The entry illustratively identifies the content that was shared, the sharer, the audience, and it can identify a number of other parameters as well. Generating the entry in the data store 196 is indicated by block 228 in FIG. 3.

Query processing component 194 then receives content retrieval queries from users of content retrieval system 176. In conjunction with access control component 192, query processing component 194 processes those queries and identifies content in data store 196, and returns content that is responsive to the queries. This is indicated by block 230 in FIG. 3, and it is described in greater detail below with respect to FIG. 5.

Figure 4A:
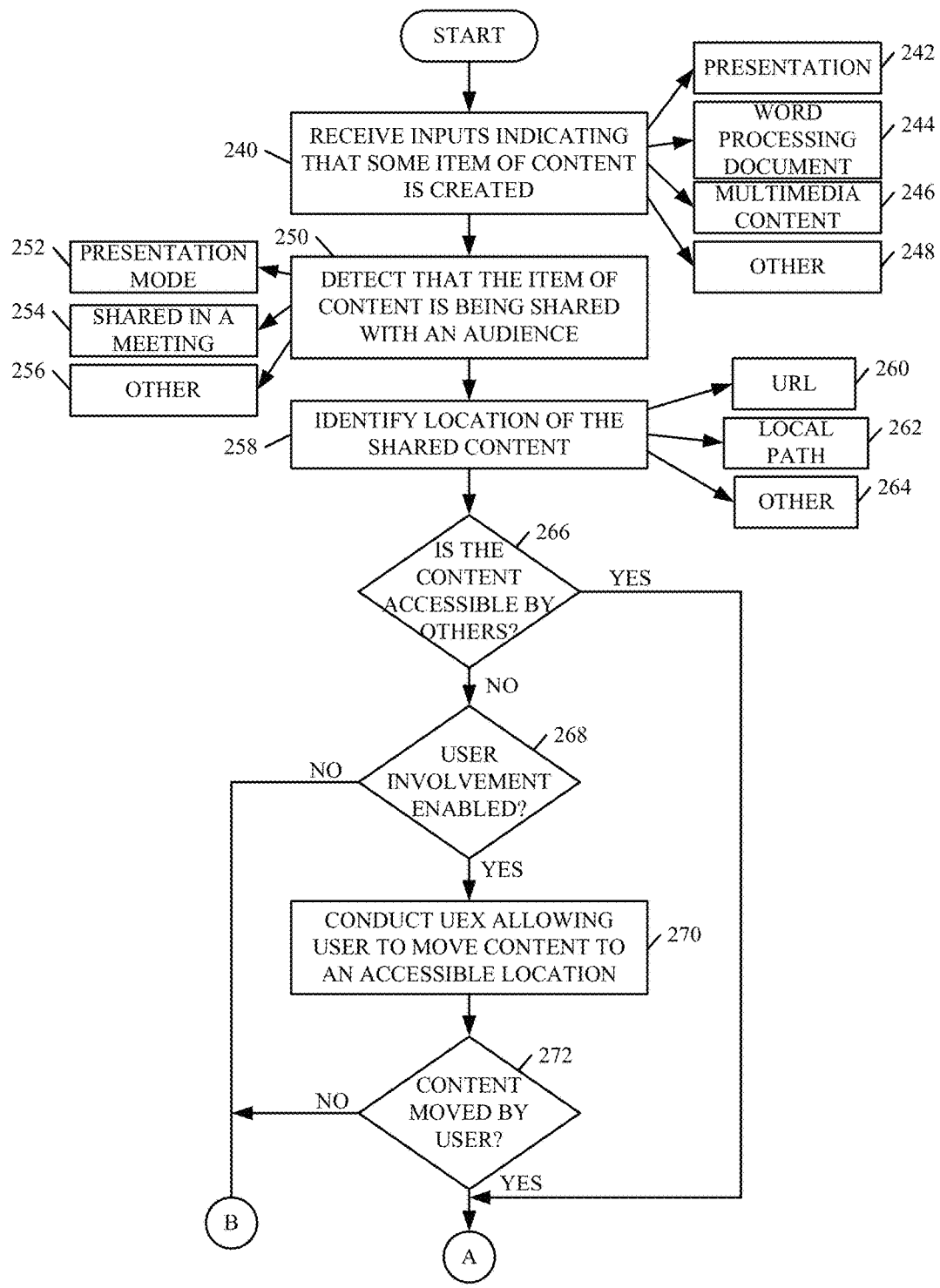
FIGS. 4A and 4B (collectively FIG. 4) show a flow diagram of one embodiment of the operation of the content retrieval system in storing content in a searchable data store.
Figure 4B:
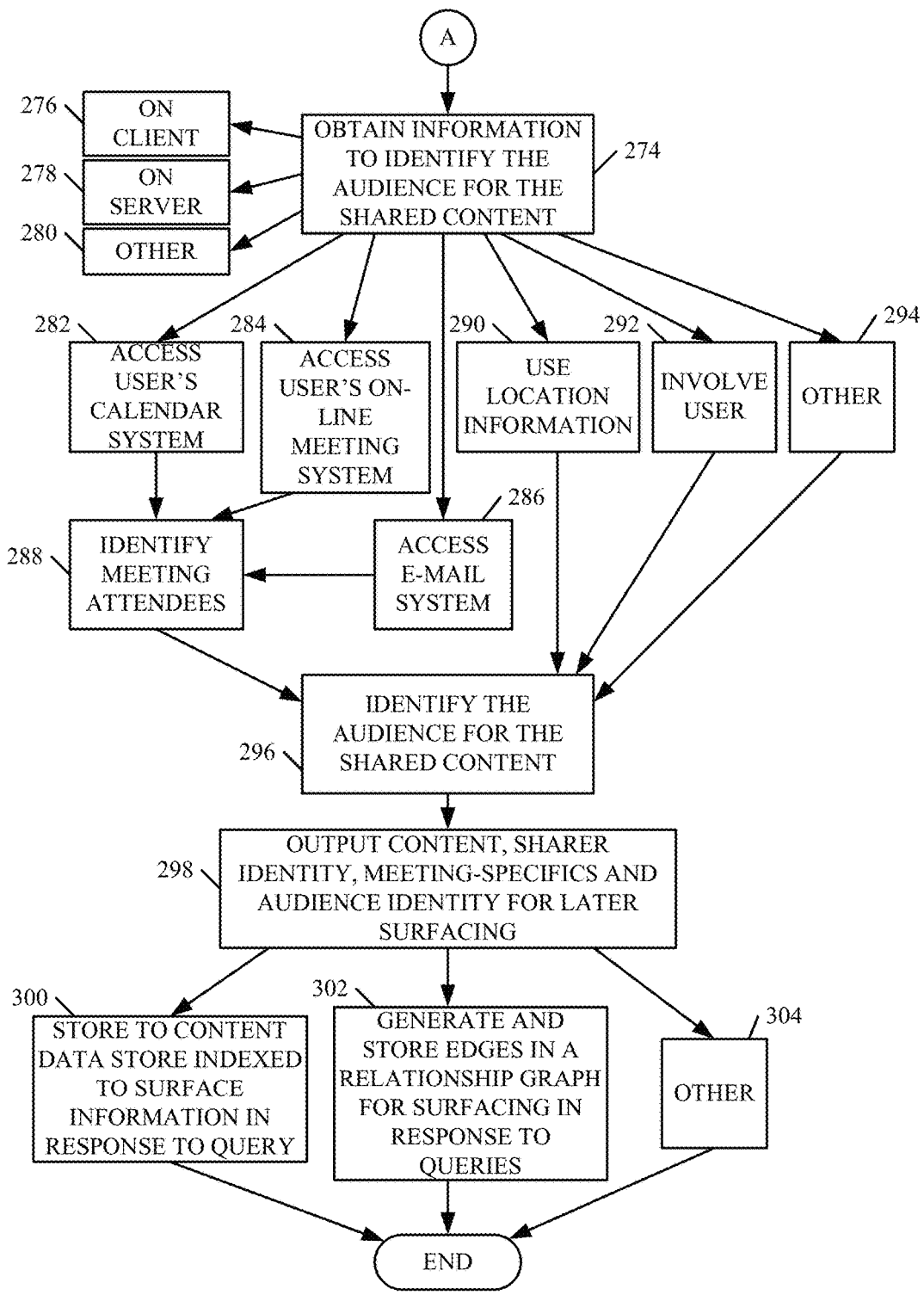

FIGS. 4A and 4B (collectively FIG. 4) show a flow diagram that illustrates one embodiment of the operation of content retrieval system 176 in detecting that content is being shared, and generating an entry in content/index store 196 indicative of the shared content. FIGS. 1, 2 and 4 will now be described in conjunction with one another.

Content retrieval system 176 can first receive an input indicating that some item of content is being created, or has just been initially created or authored. This is indicated by block 240 in FIG. 4. This can take a variety of different forms. For instance, in one embodiment, each of the information worker applications 142 has a component that notifies content retrieval system 176 when a new file is opened, or when a new file is saved, or when an existing file is edited or re-saved. Depending on the type of information worker application 142 where the content is created, it can be a wide variety of different types of content, such as a presentation 242, a word processing document 244, it can include multimedia content 246, or it can include other content 248.

At some point, the user will illustratively share the created content with others. In that case, share detection component 182 in content retrieval system 176 detects that the item of content is being shared with an audience. This is indicated by block 250 in FIG. 4. This can be done in a wide variety of different ways. In one embodiment, the particular share detector (131, 133, 152, 154 or 156) in the application where the content was created notifies share detection component 182 that the content is being shared. In another embodiment, share detection component 182 monitors the information worker applications, once they are launched, to detect that content is being shared.

In any case, the specific manner of detection can take a variety of different forms. For instance, where the information worker application 142 is placed into presentation mode 252 by the user, this can trigger an indication that content is being shared. When content is shared in another way, such as when the user is in a meeting, or otherwise, this can also be detected, and it is indicated by number 254 in FIG. 4. As examples, when the user's device is connected to an external monitor, and when an information worker application is launched, this can indicate that the content is about to be shared. Similarly, when the user shares his or her desktop in a meeting, and an information worker application is launched (or has already been launched) this can also indicate that content is being shared.

It will also be noted that content can be shared in other ways as well. This is indicated by block 256 in the flow diagram of FIG. 4.

Once share detection component 182 has detected that content is being shared, content location identifier component 184 identifies the location of the shared content. This is indicated by block 258 in FIG. 4. For instance, the content may include a uniform resource locater (URL) 260. It may also include a local path, indicating its location. This is indicated by block 262. The location where it is stored can be indicated in other ways as well, and this is indicated by block 264.

Content location identifier component 184 also determines whether the content is accessible by others, given its location. This is indicated by block 266. For instance, if the content is shared on the local hard drive of the user's laptop or desktop computer, it may not be generally accessible by others. However, if it is stored on a cloud-based, enterprise-wide storage system, or in a variety of other locations, then it may be generally accessible.

If, at block 266, it is determined that the content is not accessible by others, then user interaction component 186 can, in one embodiment, involve the user to determine whether the user wishes to make the content available to others. In one embodiment, involving the user is identified by a configuration setting which can be set to enable or disable user involvement. Determining whether user involvement is enabled is indicated by block 268. If user involvement is not enabled, then content retrieval system 176 takes no further action with respect to this particular item of shared content. However, if it is enabled, the user interaction component 186 conducts a user experience that allows the user to move the content to an accessible location. For instance, user interaction component 186 can illustratively generate user interface displays that ask the user if the user wishes to make the content accessible to others and, if so, suggest where the user might move the content to make it accessible. Conducting the user experience to allow the user to move the content is indicated by block 270 in FIG. 4.

If, during that user experience, the user indicates that he or she does not wish to make the content available, or if the user does not move the content to an accessible location, this is identified by user interaction component 186, and it is indicated by block 272 in FIG. 4. If the user does not wish to move, or does not move, the content to an accessible location, then content retrieval system 176 again takes no further action with respect to this item of shared content.

However, if, at block 266 it is determined that the content is already accessible by others, or, if at block 272 the user has moved the content to an accessible location, then processing proceeds at block 274 where audience identifier component 188 obtains information to identify the audience for the shared content. It should be noted that this processing can be done on a client device as indicated by block 176, or on a server as indicated by block 278, or in another location as indicated by block 280.

Also, obtaining information to identify the audience can take a wide variety of different forms. Content retrieval system 176 can access the user's calendar system 168, or the user's on-line meeting system 166 or the user's e-mail system 164, or all of these systems, to identify whether the user has scheduled a meeting, or is attending a meeting. Accessing these types of information are indicated by block 282, 284 and 286, respectively. If audience identifier component 188 determines that the user is in a meeting, then audience identifier component 188 identifies the meeting attendees. This is indicated by block 288 in FIG. 4.

By way of example, if audience identifier component 188 has determined that meeting system 166 is currently facilitating an on-line meeting where the user is presenting content, then audience identifier component 188 illustratively accesses the attendee list to identify other users that are currently attending that meeting. If calendar system 168 indicates that the user is currently participating in a conference call, then audience identifier component 188 identifies the attendees on the conference call. If meeting system 166 indicates that the user is in a meeting in a conference room, then audience identifier component 188 can access the corresponding meeting request or the calendars for other employees of the organization to see who else has accepted the meeting request, and is in attendance at that meeting. Identifying meeting attendees can be done in a variety of other ways as well, and those mentioned above are mentioned for the sake of example only.

Audience identifier component 188 can use other information to identify attendees as well. For instance, social network information can be used. Also, where the user is carrying a mobile device that has a location system (such as a GPS system or another location system), component 188 can use the location information that indicates the present location of the user to identify the attendees. As an example, if the location information indicates that the user is currently at the address of a vendor, then audience identifier component 188 can access business data in enterprise system 102 to identify the primary contact for that vendor. Using location information is indicated by block 290 in FIG. 4.

In another embodiment, audience identifier component 188 can involve the user who is presenting the content. This is indicated by block 292. For instance, component 188 can simply ask the user to identify the audience members who are receiving the presentation or otherwise receiving access to the content. In yet another embodiment, component 188 can perform processing to identify a potential audience list and provide the potential audience list to the user, for confirmation. Component 188 can involve the user in other ways as well.

Also, audience identifier component 188 can use other information, perform other processing, and identify audience members in other ways. This is indicated by block 294 in FIG. 4.

Regardless of what information is used, after component 188 has obtained the desired information, it identifies the audience for the shared content. This is indicated by block 296.

Indexing component 190 then outputs the shared content with a number of index parameters that can be used to index the content for later searching. In one embodiment, indexing component 190 outputs the content that was shared, along with the sharer's identity, meeting specifics that indicate the time, date and location of the meeting (as well as the meeting type, such as on-line meeting, teleconference, in-person meeting, etc.) and the audience identity (that is, the identity of the audience for the shared content). All of this information can be output to a content/index store 196 where it can be stored for later surfacing. This is indicated by block 298 in FIG. 4. Content/index store 196 then stores the content, indexed with the index parameters, so that it can be surfaced in response to later queries. This is indicated by block 300.

In another embodiment, indexing component 190 outputs the content and index parameters to graph generator and search component 162. Component 162 generates and stores edges in the relationship graph 172 for surfacing in response to later queries. This is indicated by block 302. By way of example, graph generator and search component 162 can generate entities for the sharer of the content, for the content itself, for the meeting where the content was shared, and for each of the audience members. Component 162 can then illustratively generate edges in the graph that connect the content entity, the sharer entity and the audience member entities with the meeting entity. Another edge can connect the sharer entity, with the content entity. These edges thus indicate that this particular item of content was shared by this particular sharer, at this particular meeting, with these particular audience members. Of course, other information can be included in the edges as well, such as the date and type of the meeting, and other information. This is just one way of indexing and storing the content, and it can be indexed and stored in other ways as well. This is indicated by block 304 in FIG. 4.

Figure 5:
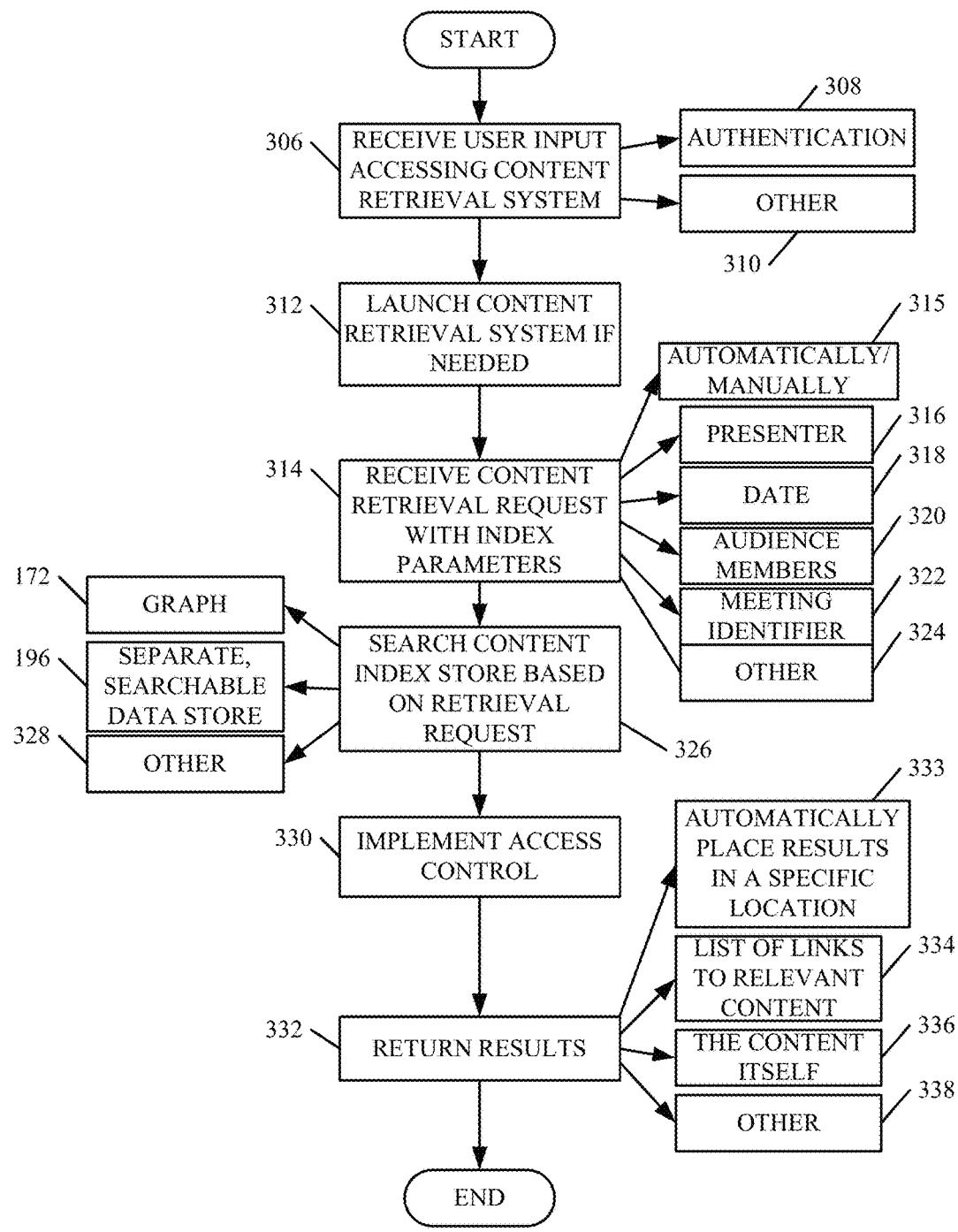
FIG. 5 is a flow diagram illustrating one embodiment of the overall operation of the system in receiving a query and returning content.

FIG. 5 is a flow diagram illustrating one embodiment of the operation of query processing component 194 in content retrieval system 176. It will be appreciated, however, that the same basic processing can be performed by graph generator and search component 162 where the content is indexed and stored as part of an enterprise graph 172. Component 194 first receives a user input accessing the content retrieval system 176 (or graph generator and search component 162). This is indicated by block 306. By way of example, the user may input authentication information (such as a username and password) as indicated by block 308. The user can input other information to access the system as well, and this is indicated by block 310.

If needed, enterprise system 102 launches content retrieval system 176 (or graph generator and search component 162). This is indicated by block 312.

The launched system then receives a content retrieval request along with any desired index parameters. This is indicated by block 314. The queries can be automatically or manually generated. This is indicated by block 315. For instance, in one embodiment, user 104 can configure system 138 to intermittently, and automatically, surface content of interest (e.g., that was presented to) user 104 and place it in a specific location for access by user 104. In another embodiment, the queries are generated without any user involvement. In yet another embodiment, the queries are manually generated by the user, as desired.

For instance, it may be that the user searching for the content does not know where the content is located, but only knows that he or she was in the audience where the content was presented, and may know the name of the presenter, the subject matter of the content or possibly other audience members and meeting specifics such as the date and time of the meeting. The user may input other parameters such as indicating that the content is popular with the user's colleagues, that the user has "liked" the content, or other parameters. Thus, the user can input into the query processing component 194 (or graph generator and search component 162) the presenter information 316, the date of the meeting 318, any other audience members 320 that the user remembers, a meeting identifier 322 that identifies the particular meeting or a wide variety of other information 324.

In response to either a manually generated query or an automatically generated query, query processing component 194 searches for the content. Searching is indicated by block 326 in FIG. 5. Again, it will be noted that, in one embodiment, component 162 can search graph 172. In another embodiment, query processing component 194 can search the separate, searchable data store 196. Of course, the search can be conducted in other places as well, and this is indicated by block 328 in FIG. 5.

Access control component 192 then implements access control on the identified search results. For instance, each item of content may have a corresponding access control list associated with it that identifies individuals or groups that have permission to access that item of content. The access control list can also illustratively contain deny entries that deny particular individuals or groups access to the content. Access control component 192 enforces the entries in the access control list, for each item of content contained in the search results. Implementing access control is indicated by block 330 in the flow diagram of FIG. 5.

Query processing component 194 (or graph generator and search component 162) then returns the results to the user. This is indicated by block 332, and it can be done in a variety of different ways. For instance, the results can be automatically placed in a specific location for later access by the user. This is indicated by block 333. Returning the results as a list of links to the relevant content is indicated by block 334. In another embodiment, the content, itself can be returned. This is indicated by block 336. The content can also be returned in other ways, and this is indicated by block 338.

Figure 6:
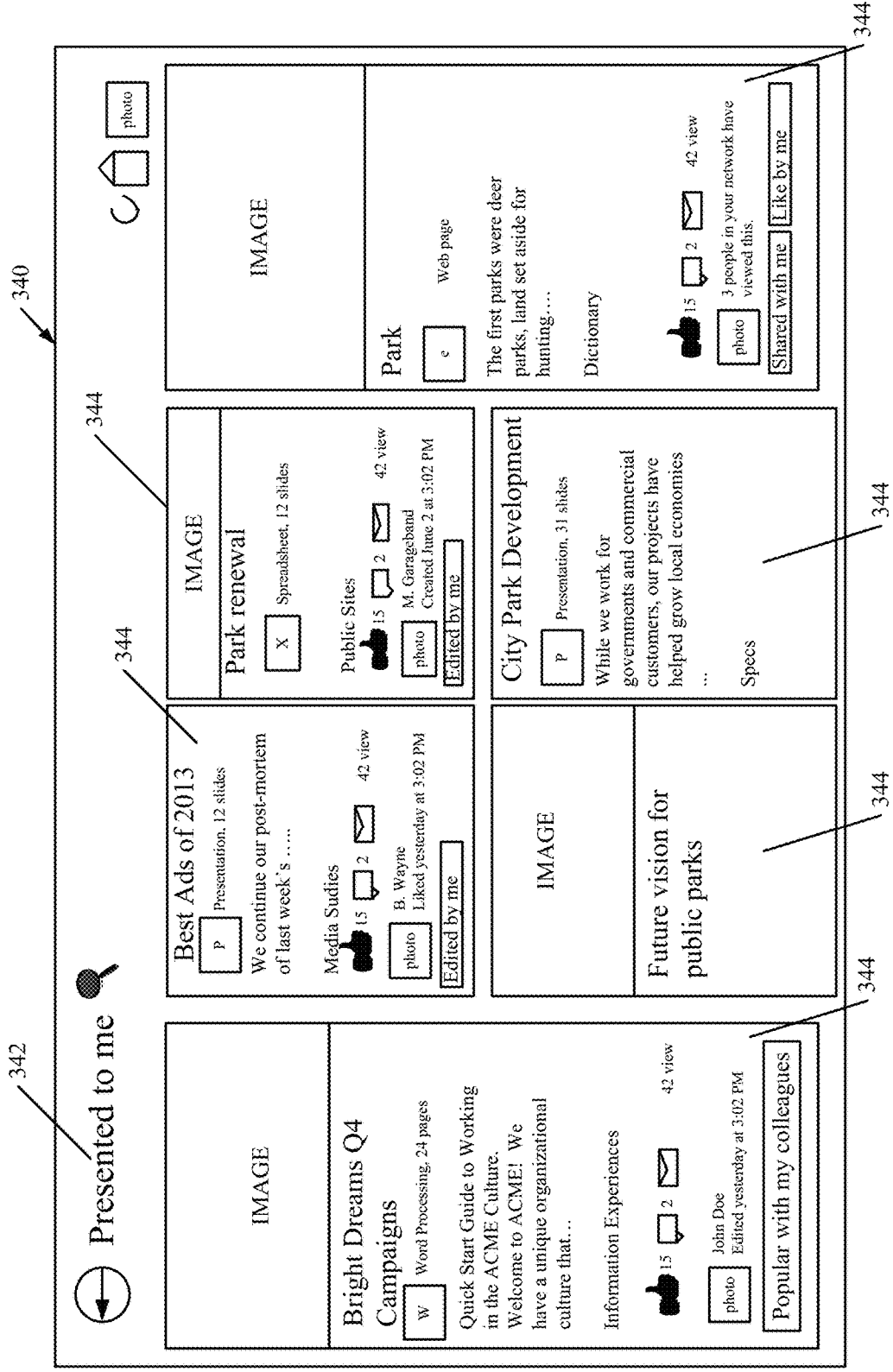
FIG. 6 shows one embodiment of an exemplary user interface display.

FIG. 6 shows one embodiment of a user interface display 340 in which content has been returned based on a manual or automated query. In the embodiment shown in FIG. 6, the user (if manual) or the system (if automatic) searching for the content has illustratively placed search terms in a search request and provided it to either query processing component 194 or graph generator and search component 162. The search terms may include, for instance, keywords indicative of the content of the item that the user is looking for (such as "City Park"), along with a search parameter indicating that the content was presented to this particular user, and perhaps a search parameter that outlines a date range, or a wide variety of other parameters.

In response, query processing component 194 (or graph generator and search component 162) illustratively returns search results. The results can be returned in a variety of different ways, one of which is indicated by user interface display 340. For instance, the results can include a search results title section 342 indicating that this is all content that was presented to the user searching for the content. It also illustratively includes a plurality of tiles or cards 344, each comprising a link to an underlying item of content (such as a presentation), that meets the search query. Each tile or card 344 also illustratively displays a number of items of summary information, such as a summary of the underlying content, a title of the underlying content, perhaps an image corresponding to the underlying content, the date that the content was created, edited or presented, social network interactions with the content (such as likes, dislikes, messages, etc.), an indication of who generated or presented the content, and an indication of who else viewed the content. It can show a number of times that the content was viewed, an indication as to whether the item of content is popular with the user's colleagues, whether the user has liked the content, and other information. It also illustratively indicates the type of information worker application that was used to generate the content, such as whether the application was a word processing application, a slide presentation application, a spreadsheet application, whether the information is a webpage or from another application. Further, it can include the size of the content (such as the number of slides in the content, the number of pages in a document, etc.). Of course, these items of information on tiles or cards 344 are exemplary only and other items, or different items, can be included on the tiles or cards 344. Also, the results can be displayed in a way other than on the tiles or cards 344, such as in a list or otherwise.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
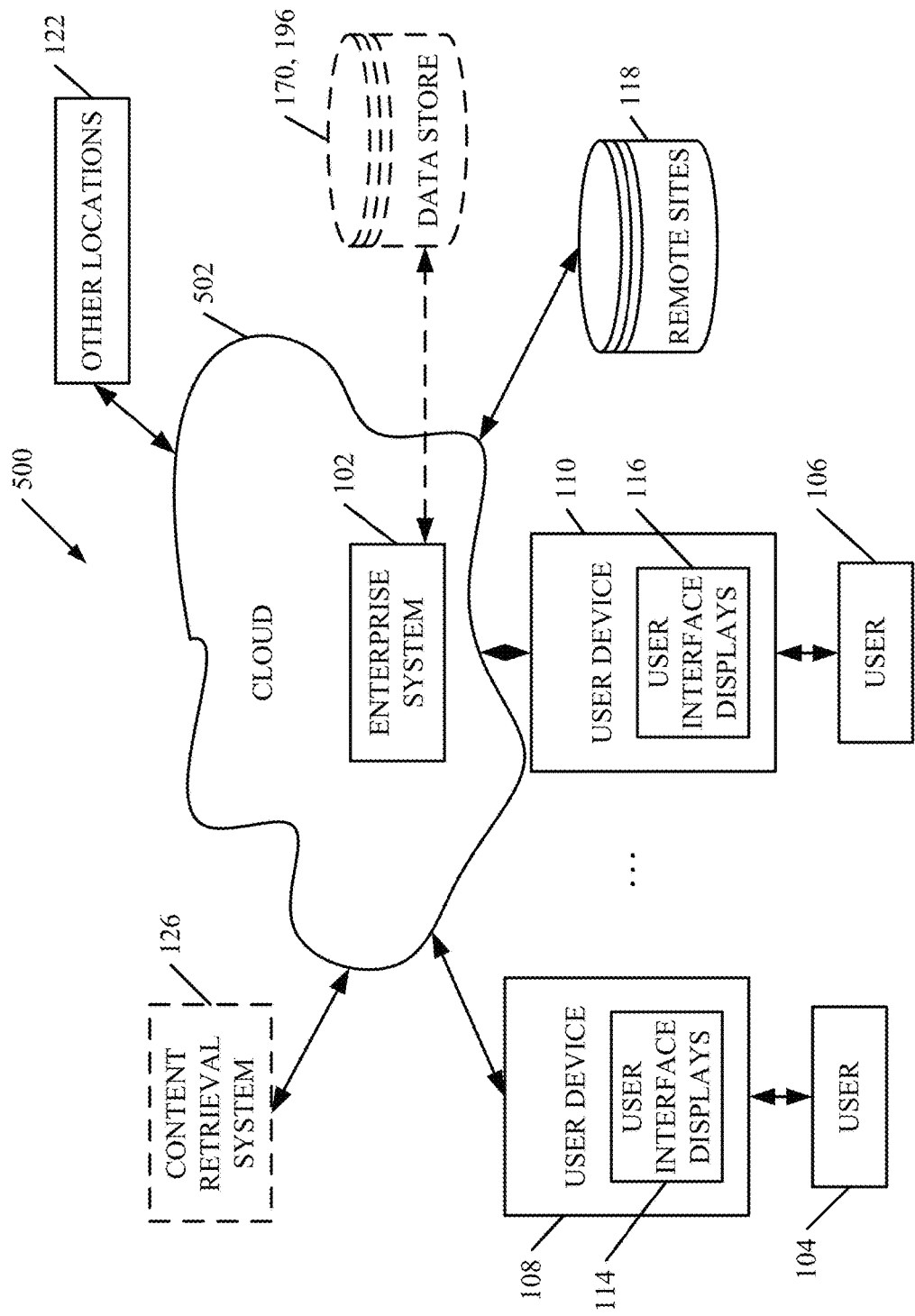
FIG. 7 shows a block diagram of the architecture illustrated in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 7, some items are similar to those shown in FIG. 1 and they are similarly numbered. FIG. 7 specifically shows that enterprise system 102 can be located in cloud 502 (which can be public, private, or a combination where portions are public while others are private). Therefore, users 104 and 106 use user devices 108 and 110 to access those systems through cloud 502.

FIG. 7 also depicts another embodiment of a cloud architecture. FIG. 7 shows that it is also contemplated that some elements of enterprise system 102 can be disposed in cloud 502 while others are not. By way of example, data stores 170, 196 can be disposed outside of cloud 502, and accessed through cloud 502. In another embodiment, system 126 is also outside of cloud 502. Regardless of where they are located, they can be accessed directly by devices 108, 110, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
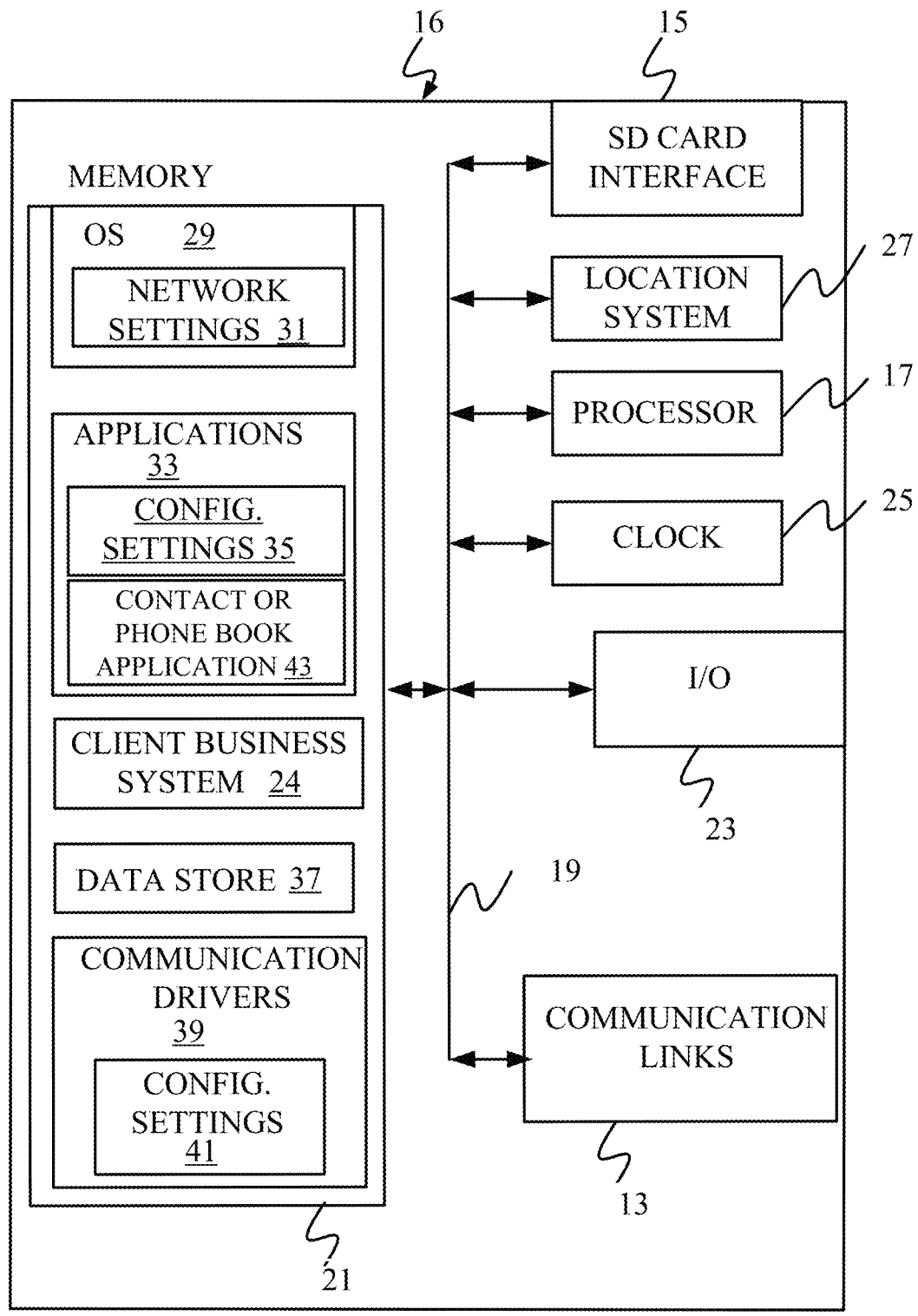
FIGS. 8-12 show various embodiments of mobile devices.

FIG. 8 is a simplified block diagram of one illustrative embodiment of a handheld or mobile computing device that can be used as a user's or client's hand held device 16, in which the present system (or parts of it) can be deployed. FIGS. 9-12 are examples of handheld or mobile devices.

FIG. 8 provides a general block diagram of the components of a client device 16 that can run components of enterprise system 102 or content retrieval system 126 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody server 160 or processors 134, 136 or 180 from FIGS. 1 and 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 9:
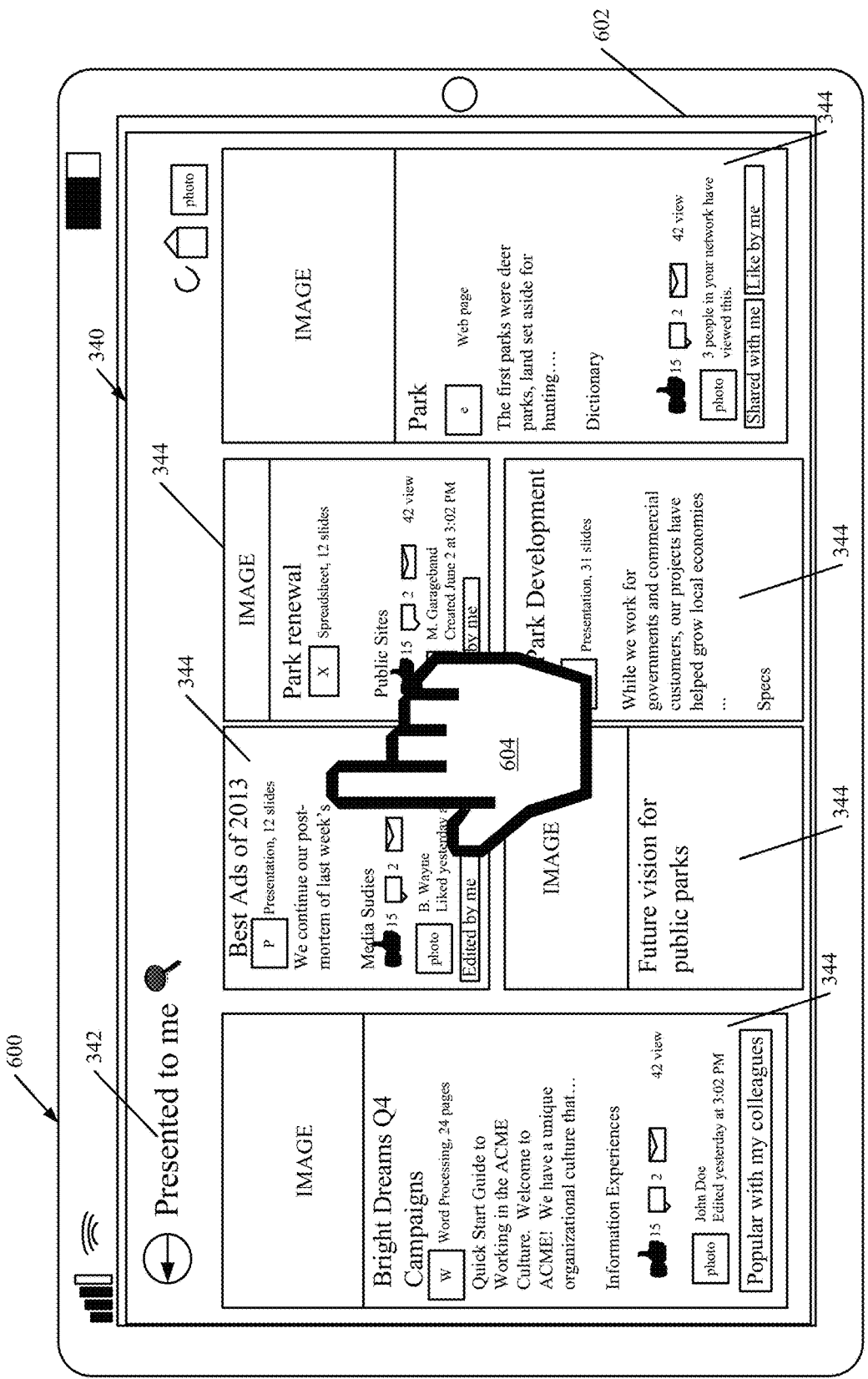

FIG. 9 shows one embodiment in which device 16 is a tablet computer 600. In FIG. 9, computer 600 is shown with the user interface display from FIG. 6 displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
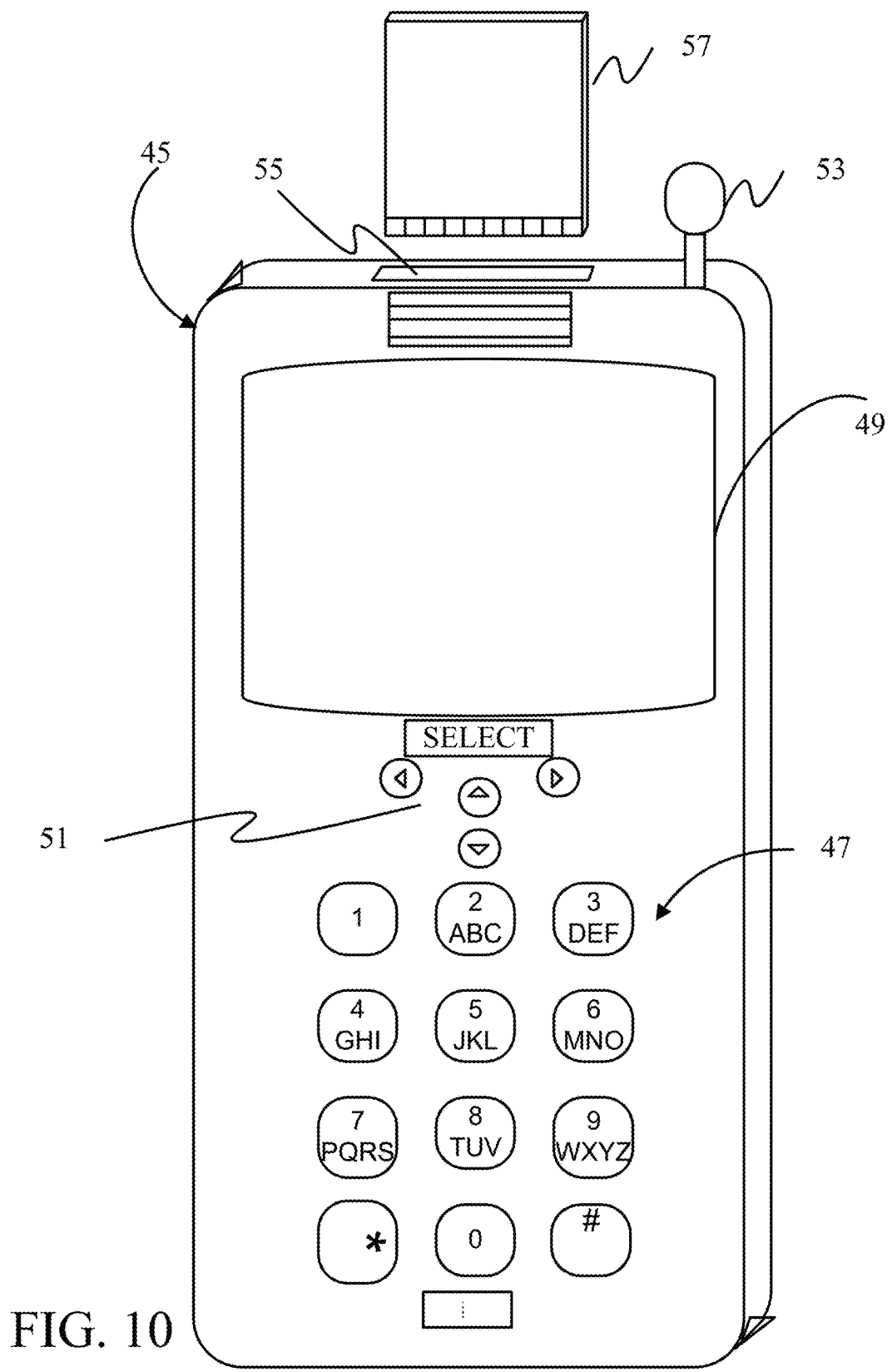
Figure 11:
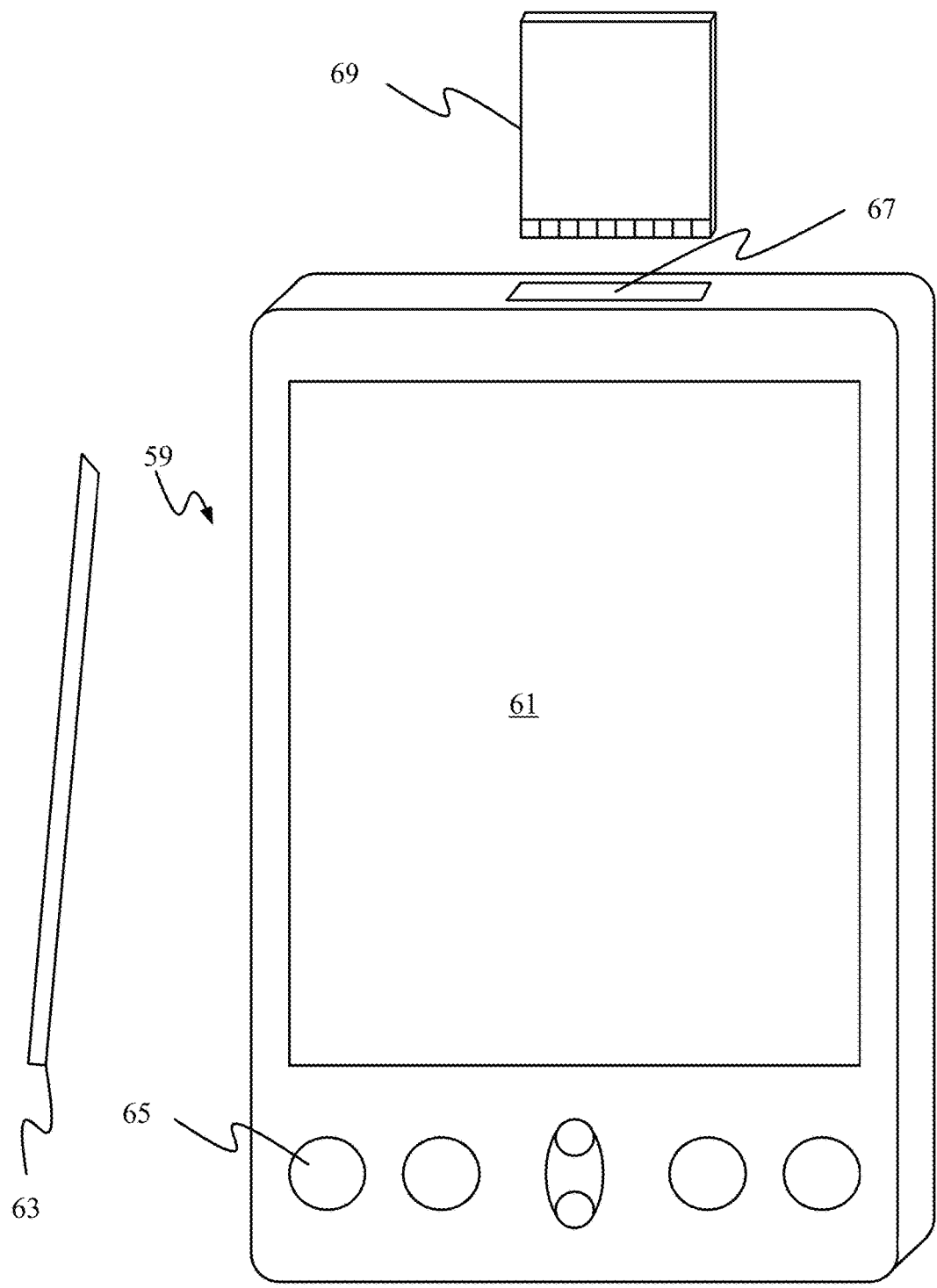

FIGS. 10 and 11 provide additional examples of devices 16 that can be used, although others can be used as well. In FIG. 10, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 12:
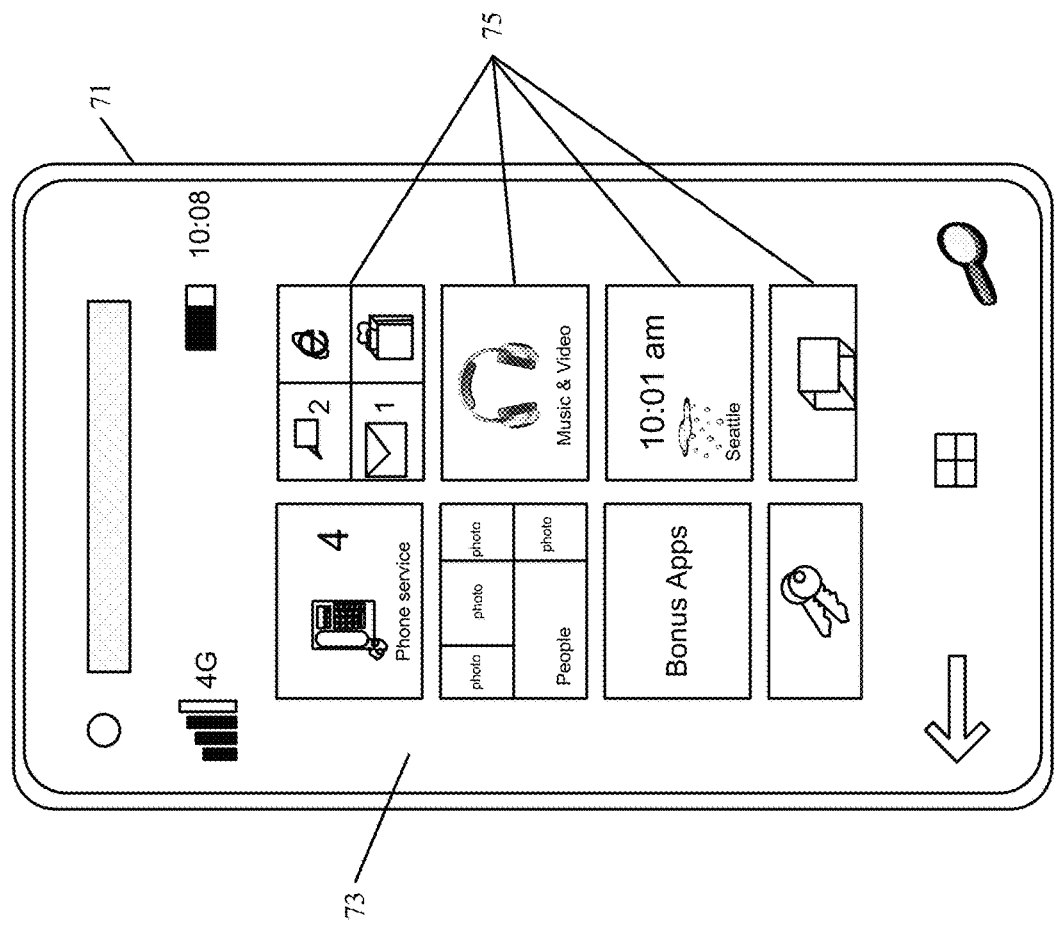

FIG. 12 is similar to FIG. 10 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
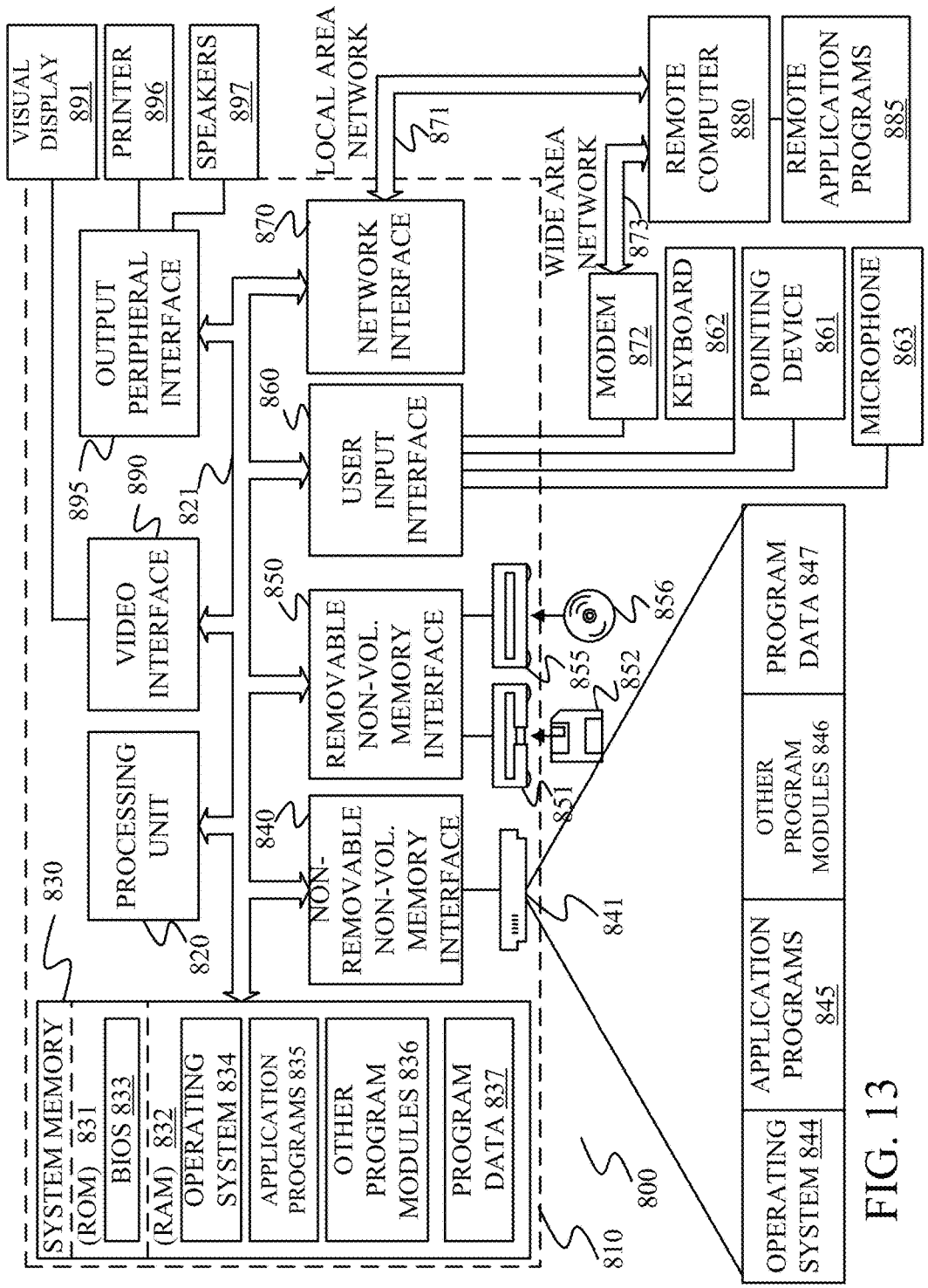
FIG. 13 shows one embodiment of a block diagram of a computing environment.

FIG. 13 is one embodiment of a computing environment in which architecture 100, or parts of it, (for example) can be deployed. With reference to FIG. 13, an exemplary system for implementing some embodiments includes a general-purpose computing device in the form of a computer 810. Components of computer 810 may include, but are not limited to, a processing unit 820 (which can comprise server 160 or processors 134, 136 or 180), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    storing content;
    after storing the content, detecting that an item of shared content included in the content was presented to an audience including one or more audience members;
    identifying a location where the item of shared content is stored;
    determining whether the identified location where the item of shared content is stored is accessible to users other than the identified sharer from a storage location accessible enterprise-wide; and
    if not, generating a user interface display with user input mechanisms that are actuated to move the item of shared content to an accessible location;
    identifying a sharer of the item of shared content;
    identifying audience members that partook in the item of shared content; and
    based on the determination that the item of shared content was presented, generating an entry in a data store, the entry including a content identifier identifying the item of shared content and a plurality of different index parameters including a sharer identifier identifying the sharer and audience member identifiers identifying the audience members.

2. The computer-implemented method of claim 1 wherein detecting that the item of shared content is shared comprises:
    detecting that an application on which the item of shared content was created is placed in a mode indicative of sharing the item of shared content.

3. The computer-implemented method of claim 1 wherein detecting that the item of shared content is shared comprises:
    detecting that a device that is accessing the item of shared content is coupled to an external monitor.

4. The computer-implemented method of claim 1 wherein detecting that the item of shared content is shared comprises:
    detecting that a device that is accessing the item of shared content is placed in a mode in which the device is sharing a desktop.

5. The computer-implemented method of claim 1 wherein identifying audience members comprises:
    accessing meeting information to identify attendees at a meeting at which the sharer is sharing the item of shared content.

6. The computer-implemented method of claim 1 wherein identifying audience members comprises:
    accessing location information indicative of a location of the sharer when the sharer is sharing the item of shared content.

7. The computer-implemented method of claim 1 wherein identifying audience members comprises:
    generating a user interface display with user input mechanisms that are actuated by the sharer to identify the audience members.

8. The computer-implemented method of claim 1 and further comprising:
    receiving a content query with a set of input parameters, the input parameters including an audience member identifier; and
    searching the data store to identify items of content as results, based on the input parameters.

9. A computer readable storage medium that stores computer executable instructions which, when executed by a computer, cause the computer to perform a method, comprising:
- storing an item;
- after storing the item, detecting that the item was presented to an audience including one or more audience members;
- identifying a location where the item is stored;
- determining whether the identified location where the item of shared content is stored is accessible to users other than the identified sharer from a storage location accessible enterprise-wide; and
- if not, generating a user interface display with user input mechanisms that are actuated to move the item of shared content to an accessible location;
- identifying a sharer of the item;
- identifying audience members that attended a meeting in which the item was shared; and
- based on identifying that the item was presented, generating an entry in a data store, the entry including a content identifier identifying the item and a plurality of different index parameters including a sharer identifier identifying the sharer and audience member identifiers identifying the audience member, wherein the audience member identifiers includes an audience member identifier identifying the audience member.

10. The computer readable storage medium of claim 9 and further comprising:
- receiving a content query with input parameters indicating a user attended a meeting;
- searching the data store to identify items of content that were previously presented to the user; and
- returning results indicative of the identified items of content.

11. A processor in electronic communication with computer readable storage media, the computer-readable storage media storing instructions that, when executed, perform a method, the method comprising:
- storing content;
- after storing the content, detecting that an item of shared content included in the content was presented to an audience including one or more audience members;
- identifying a location where the item of shared content is stored;
- determining whether the identified location where the item of shared content is stored is accessible to users other than the identified sharer from a storage location accessible enterprise-wide; and
- if not, generating a user interface display with user input mechanisms that are actuated to move the item of shared content to an accessible location;
- identifying a sharer of the item of shared content;
- identifying audience members that partook in the item of shared content; and
- based on the determination that the item of shared content was presented, generating an entry in a data store, the entry including a content identifier identifying the item of shared content and a plurality of different index parameters including a sharer identifier identifying the sharer and audience member identifiers identifying the audience members.

12. The processor of claim 11, wherein detecting that the item of shared content is shared comprises:
- detecting that an application on which the item of shared content was created is placed in a mode indicative of sharing the item of shared content.

13. The processor of claim 11, wherein detecting that the item of shared content is shared comprises:
- detecting that a device that is accessing the item of shared content is coupled to an external monitor.

14. The processor of claim 11, the wherein detecting that the item of shared content is shared comprises:
- detecting that a device that is accessing the item of shared content is placed in a mode in which the device is sharing a desktop.

15. The processor of claim 11, wherein identifying audience members comprises:
- accessing meeting information to identify attendees at a meeting at which the sharer is sharing the item of shared content.

16. The processor of claim 11, wherein identifying audience members comprises:
- accessing location information indicative of a location of the sharer when the sharer is sharing the item of shared content.

17. The computer readable storage medium of claim 10, wherein the content query comprises an automatically generated content query.

* * * * *